United States Patent [19]

Fukase et al.

[11] Patent Number: 5,227,347

[45] Date of Patent: Jul. 13, 1993

[54] SINTERED PRODUCT FOR MAKING SHEATH USED FOR CONTINUOUS THIN PLATE MOLDING APPARATUS AND SHEATH USING THE SAME

[75] Inventors: Hisahiko Fukase, Tokyo; Heiji Kato, Yokosuka; Akihiro Nomura; Kunio Matui, both of Yokohama; Kenichi Adachi, Omuta; Hiroshi Nishikawa, Omuta; Hiroshi Harada, Omuta, all of Japan

[73] Assignee: Ishikawajima-Harima Jukogyo Kabushiki Kaisha, Tokyo, Japan

[21] Appl. No.: 667,919

[22] Filed: Mar. 11, 1991

[30] Foreign Application Priority Data

Mar. 14, 1990 [JP] Japan .................. 2-61168

[51] Int. Cl.⁵ .................. C04B 35/56; C04B 35/51
[52] U.S. Cl. .................. 501/96; 501/97; 501/98
[58] Field of Search .................. 501/96, 97, 98

[56] References Cited

U.S. PATENT DOCUMENTS 4,647,546 3/1987 Hall, Jr. et al. .................. 501/96
4,885,264 12/1989 Sindlhauser et al. .................. 501/96

Primary Examiner—Mark L. Bell
Assistant Examiner—A. Wright
Attorney, Agent, or Firm—Armstrong, Westerman, Hattori, McLeland & Naughton

[57] ABSTRACT

This invention concerns a sintered article for a sheath in an apparatus for continuous casting of a thin sheet and a sheath using the sintered article. The sintered article comprises boron nitride, zirconium oxide, and at least one member selected from the group consisting of aluminum nitride and aluminum borate and combines resistance to thermal shock, lubricity, and strength. The sheath is formed of the sintered article and, therefore, enjoys the prominent properties of the sintered article.

6 Claims, 2 Drawing Sheets

SINTERED PRODUCT FOR MAKING SHEATH USED FOR CONTINUOUS THIN PLATE MOLDING APPARATUS AND SHEATH USING THE SAME

BACKGROUND OF THE INVENTION

1. Field of the Invention

This invention relates to a sintered article for a heath to be used in an apparatus for continuous casting of a thin sheet and to a sheath using the sintered article. More particularly, it relates to a sintered article for a sheath to be used in an apparatus for continuous casting of a thin sheet, which apparatus is provided on the melt pouring side thereof with cylindrical surfaces as in a twin roll type or twin belt type apparatus which comprises two water-cooled rolls or two endless belts parallelly opposed to each other across a gap with the rotary shafts thereof laid horizontally and two sheath plates applied one each fast to the opposite lateral ends of the parallelly disposed water-cooled rolls or endless belts so as to give rise to an enclosure like a container on the parallelly disposed water-cooled rolls or endless belts and which effects continuous casting of a thin sheet by pouring a melt into the enclosure and rotating the two water-cooled rolls or endless bolts inwardly toward each other, and a sheath using the sintered article.

2. Description of the Prior Art

Heretofore, sintered articles of boron nitride (BN) and sintered articles of zirconium oxide ($ZrO_2$) and alumina ($Al_2O_3$) have been known as materials for the parts which, like a sheath used in an apparatus provided on the inlet side thereof with cylindrical surfaces and operated for continuous casting of a thin sheet, are required to possess stability to resist thermal shock, corrosion, and abrasion.

Incidentally, the sintered articles of BN show prominence in resistance to thermal shock and in lubricity on the one hand and betray low strength and deficiency in resistance to corrosion in the melt of steel such as stainless steel on the other hand. In contrast, the sintered articles of $ZrO_2$ and $Al_2O_3$ possess high strength and nevertheless suffer from the disadvantage that the sheaths using these sintered articles inflict scratches on the water-cooled rolls or endless belts which slide on the sheaths.

For this reason, it has been proposed to divide a sheath between the portion destined to contact the melt and the part destined to slide against the water-cooled rolls or endless belts and use the sintered article of BN or $Si_3N_4$ and the like for the former portion and the sintered article of $ZrO_2$ or $Al_2O_3$ and the like for the latter portion (Japanese Patent Application Disclosure SHO 62(1987)-166,054 and Japanese Patent Application Disclosure SHO 60(1985)-162,557).

The conventional sheath of the aforementioned type which combines portions different in material as described above, however, it has the disadvantage that the sheath is complicated in construction and troublesome to produce because it possibly induces leakage of the melt unless the different materials being used are adapted to possess an equal thermal expansion coefficient and the portions different in material are fitted to each other exactly. Thus, the desirability of providing a sintered article for an sheath which produces the sheath consisting solely of the sintered article instead of a combination of different materials and excelling in resistance to corrosion, resistance to thermal shock, and resistance to abrasion and consequently providing a sheath using the sintered article has been finding enthusiastic recognition.

SUMMARY OF THE INVENTION

This invention, perceived in the light of the true state of the prior art mentioned above, has as an object thereof the provision of a sintered article for a sheath which procures consisting solely of the sintered article and excelling in resistance to corrosion, resistance to thermal shock, and resistance to abrasion and a sheath using the sinetered article thereby alleviating the burden imposed on the apparatus used for continuous casting of a thin sheet.

After a diligent study, the present inventors have taken notice of the fact that BN excels in resistance to thermal shock and in lubricity, aluminum nitride (AlN) and aluminum borate (compound of $Al_2O_3$ and $B_2O_3$) excel in resistance to corrosion in fused steel, and $ZrO_2$ excels in resistance to abrasion at elevated temperatures and consequently have found that a sintered article for a sheath possessing a prominent well-balanced quality manifested in resistance to thermal shock, resistance to corrosion, and resistance to abrasion and a sheath using the sintered article and consequently enjoying the same prominent quality as the sintered article are obtained by combining BN, AlN and/or the compound of $Al_2O_3$ and $B_2O_3$, and $ZrO_2$ in a suitable ratio. The present invention has been perfected as the result.

The object described above is accomplished by a sintered article composed of the following components, i) to iii), and used for a sheath in an apparatus for continuous casting of a thin sheet and also by a sheath formed of the sintered article and used in the apparatus for continuous casting of a thin sheet:

i) Not less than 65% by weight of BN,
ii) Not less than 9% by weight of $ZrO_2$, and
iii) Not less than 5% by weight of at least one member selected from the group consisting of AlN and the compound of $Al_2O_3$ and $B_2O_3$.

DETAILED DESCRIPTION OF THE INVENTION

Figure 1:
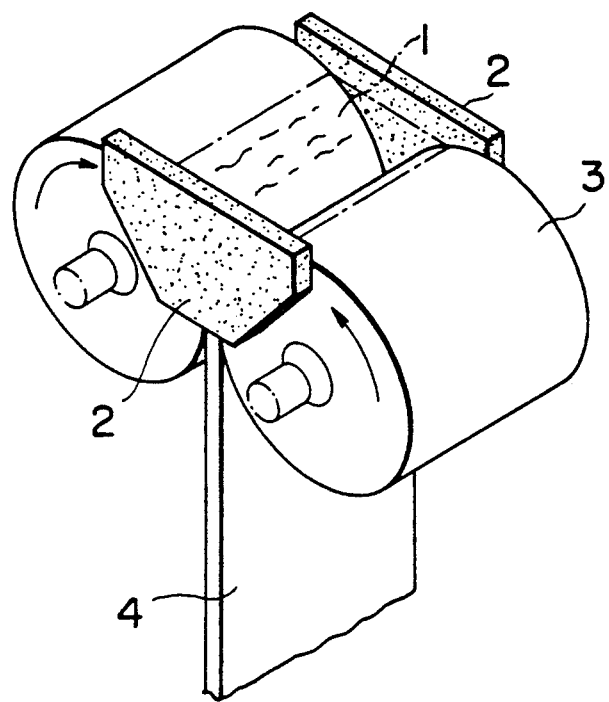
FIG. 1 is an explanatory diagram of a twin roll type apparatus for continuous casting of a thin sheet.

Now, the present invention will be described in detail below.

The sintered article of this invention is required to have a BN content of not less than 65% by weight and particularly not less than 65% by weight and less than 86% by weight. If the BN content is less than 65% by weight, the sintered article is deficient in resistance to thermal shock due to fused steel and is liable to sustain cracks when it is immersed in fused steel or passed under fused steel. If the BN content exceeds 86% by weight, the sintered article tends to be deficient in strength.

The BN powder as raw material before sintering has no particular restriction. The BN powder to be used is desired to be of the type which is converted in a sintered article into a hexagonal BN of high crystallinity because this type imparts enhnaced lubricity to the sintered article. To be specific, the BN in the sintered article is desired to be hexagonal BN for the purpose of enabling the sintered article to acquire lubricity. For this reason, it is desirable to use a hexagonal BN powder as the raw material before sintering.

The sintered article is required to have a $ZrO_2$ content of not less than 9% by weight, desirably not less than 15% by weight, and particularly not less than 9% by weight and less than 35% by weight. If the $ZrO_2$ content is less than 9% by weight, the sintered article is deficient in resistance to abrasion at elevated temperatures and the heath using this sintered article undergoes heavy wear per unit time and tends to induce leakage of a fused material to the extent of rendering it difficult for the operation of the sheath to be continued for a long time. If the $ZrO_2$ content exceeds 35% by weight, the sintered article is deficient in resistance to thermal shock and liable to sustain cracks.

The zirconia stabilized partially or completely by the addition of about 4 to 12 mol % of CaO or about 2 to 12 mol % of $Y_2O_3$, for example, may be used as the raw material of $ZrO_2$ powder before sintering. It is, however, desirable to use completely stabilized zirconia because it discourages the susceptibility of the sintered article to the occurrence of cracks.

This sintered article of this invention further incorporates therein both or either of AlN and the compound of $Al_2O_3$ and $B_2O_3$. The content of this additional component is required to be not less than 5% by weight, desirably not less than 10% by weight, and particularly not less than 5% by weight and less than 45% by weight. If this content is less than 5% by weight, the sheath using the sintered article encounters difficulty in exhibiting sufficient resistance to corrosion in the fused steel. If the content exceeds 45% by weight, the sintered article is deficient in resistance to thermal shock and therefore liable to sustain cracks.

In the aforementioned group consisting of AlN and the compound of $Al_2O_3$ and $B_2O_3$, the synthetic powder produced in advance by combining an $Al_2O_3$ powder and a $B_2O_3$ powder in a prescribed molar ratio may be used and the mixed powder obtained simply by mixing an $Al_2O_3$ powder with a $B_2O_3$ powder may be used otherwise as the raw material for the compound of $Al_2O_3$ and $B_2O_3$. For the sintered article to be produced with prominent properties, it is desirable to use the synthetic powder which is obtained by combining $Al_2O_3$ and $B_2O_3$ in advance in a molar ratio of 9:2.

The compounds of $Al_2O_3$ and $B_2O_3$ which are usable effectively herein include $9Al_2O_3 \cdot 2B_2O_3$, $2Al_2O_3 \cdot B_2O_3$, etc.

A mixture of the raw materials and a binder is preferably used for the production of the sintered article. The mixture is desired to contain the binder not more than 5% by weight of the mixture, for the purpose of improving the sintering property of the mixture without a sacrifice of the sintered article's resistance to thermal shock or to abrasion. The sintered article which is produced of the mixture also contains the binder not more than 5% by weight of the sintered article. The binders which are effectively usable herein include the compound of CaO and $B_2O_3$, the compound of MgO and $B_2O_3$, the compound of SrO and $B_2O_3$, and the compound of BaO and $B_2O_3$, for example for BN and the compounds such as $Y_2O_3$ and MgO, for example, for AlN.

If the total amount of the binders to be added exceeds 5% by weight, the disadvantage arises that the sintered article to be consequently produced is deficient in resistance to thermal shock and resistance to abrasion.

The compounds of CaO and $B_2O_3$ which are effectively usable herein inlcude $2CaO \cdot 3B_2O_3$, $CaO \cdot 2B_2O_3$, $CaO \cdot 2B_2O_3$, $3CaO \cdot B_2O_3$, and $2CaO \cdot B_2O_3$, for example.

The raw materials for the sintered article are invariably in a powdery form. For the raw materials to produce a highly desirable sintered article, the particles of the raw materials are desired to be small. Specifically, the particles are desired to have diameters not exceeding 10 $\mu$m.

The sintered article of this invention is produced by the use of a hot press, for example. This production can be effected as follows.

First, the BN powder, the $ZrO_2$ powder, and both or either of the AlN powder and the compound powder of $Al_2O_3$ and $B_2O_3$ (which may be a mixture of $Al_2O_3$ powder and $B_2O_3$ powder) are uniformly mixed in a mixing ratio calculated to produce a sintered article of a prescribed composition. In a graphite mold, the resultant mixed powder is hot pressed under the conditions 1,900° to 2,100° C. of temperature and 100 to 200 kg/cm$^2$ of pressure, such that the resultant sintered article acquires a density of not less than 70% of the theoretical density. The sheath of the present invention can be produced, for example, by machining the resultant sintered article in a prescribed shape.

Figure 2:
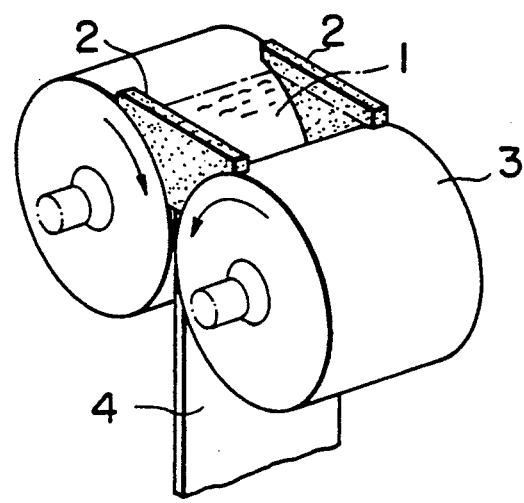
FIG. 2 is an explanatory diagram of another twin roll type apparatus for continuous casting of a thin sheet.
Figure 3:
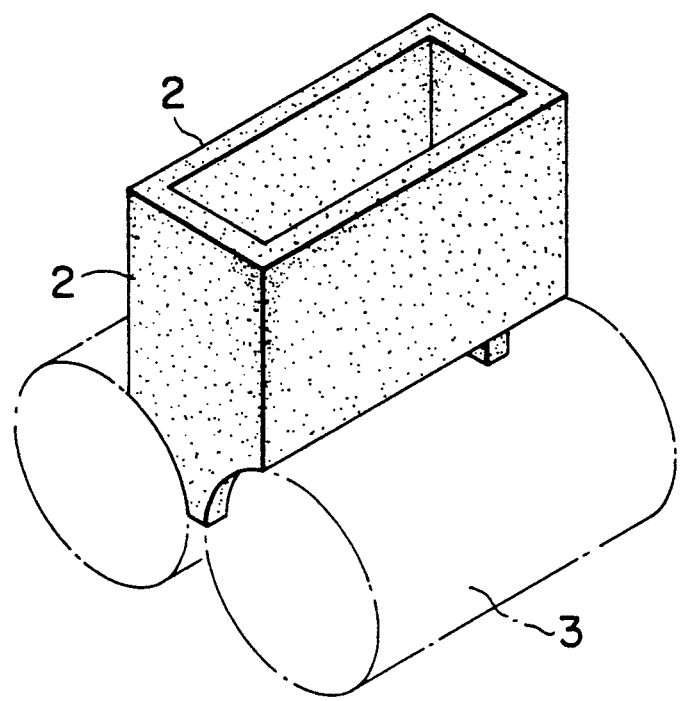
FIG. 3 is an explanatory diagram of a sheath to be used in a twin roll type apparatus for continuous casting of a thin sheet.
Figure 4:
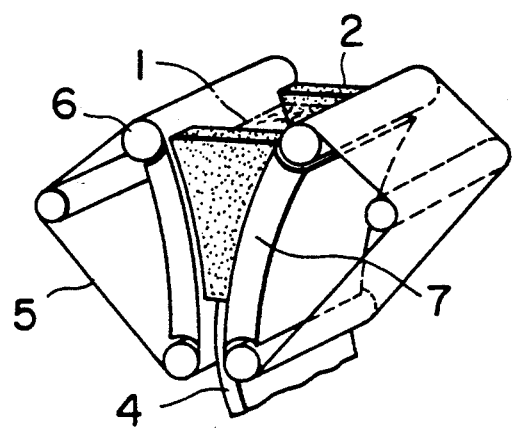
FIG. 4 an explanatory diagram of a twin belt type apparatus for continuous casting of a thin sheet.

FIG. 1 to FIG. 4 illustrate examples of a sheath 2 and FIG. 1 to FIG. 3 illustrate examples of a sheath 2 in a twin roll type apparatus for continuous casting of a thin sheet using two water-cooled rolls 3 and FIG. 4 illustrate an example of a sheath 2 in a twin belt type apparatus for continuous casting of a thin sheet using two endless belts 5.

In FIG. 1 and FIG. 2, 1 stands for fused metal, 2 for a sheath, 3 for a water-cooled roll, and 4 for a thin sheet. Particularly, the sheath 2 shown in FIG. 1 consists of two pieces applied one each fast to the opposite end faces of the water-cooled rools 3 and the sheath 2 shown in FIG. 2 consists of two pieces applied one each fast to the inner upper surfaces of the water-cooled rolls 3 in the opposite sides thereof.

The sheath 2 shown in FIG. 3 has a box-shaped structure with the lower side of which, similarly to the sheath 2 of FIG. 2, contacts the inner upper surfaces of the water-cooled rolls 3 on the opposite ends thereof. It is, therefore, allowed to reserve the fused metal 1 (FIG. ) in a larger amount.

In FIG. 4, 1 stands for fused metal, 2 for a sheath, 4 for a thin sheet, 5 for an endless belt, 6 for a guide roll, and 7 for a water-cooling device. Particularly, this sheath 2 is so disposed as to be nipped between two endless belts 5.

Now, this invention will be described more specifically below with reference to working examples, which are intended to be merely illustrative of and not in any sense limitative of the invention.

First, the methods used in the working examples and the comparative experiments to be cited hereinbelow for evaluation of samples will be described below.

(1) Density

The density of a sample sintered article was determined by measuring the dimensions of the sample and finding the volume thereof and, at the same time, weighing the sample, and calculating the following formula, using the volume and the weight.

$$Density\ (g/cm^3) = Weight\ (g)/volume\ (cm^3)$$

The properties of the following items (2) to (4) were evaluated by the use of a twin roll type apparatus for continuous casting of a thin sheet, constructed as illustrated in FIG. 1 and operated under the following conditions. ① Water-cooled rolls These were internally water-cooled cast rolls of copper measuring 1,000 mm in diameter and 1,000 mm in length. The thin sheet to be cast measured 3 mm in thickness and 1,000 mm in width. The water-cooled rolls were rotated at a rate of 32 m/min.

② Sheath

This was made of a varying sintered article obtained in the working examples and the comparative experiments and used in the apparatus.

③ Fused metal

This was the fused mass of SUS304 steel. The temperature of the fused metal held in a turn dish was 1,530° C.

(2) Resistance to thermal shock

A sample sheath was visually examined to find whether or not it sustained a crack. The sample containing no crack was indicated by the mark "o" and the sample containing a crack by the mark "x."

(3) Resistance to corrosion

A sample sheath operated for continuous casting was visually examined as to the sign of corrosion. The sample showing virtually no sign of corrosion was indicated by the mark "o," the sample showing a recognizable sign of slight corrosion but showing no sign of leakage of fused metal by the mark "Δ," and the sample showing a sign of heavy corrosion and suffered from leakage of fused metal during the continuous casting by the mark "x."

(4) Resistance to abrasion

A sample sheath after continuous casting was visually examined to determine whether or not it sustained abrasion. The sample showing virtually no sign of visible abrasion was indicated by the mark "o," the sample showing a sign of slightly recognizable abrasion but showing no sign of leakage of fused metal by the mark Δ"," and the sample showing a sign of heavy abrasion and suffering from leakage of fused metal during the continuous casting by the mark "x."

EXAMPLES 1 to 5 and COMPARATIVE EXPERIMENTS 1 to 3 and 5

In a shaking mill, a BN powder (Grade GP hexagonal BN crystals of purity of 99.0%, produced by Denki Kagaku Kogyo Kabushiki Kaisha), a stabilized $ZrO_2$ powder (Grade 6Y $ZrO_2$ of a purity of 89.8%, containing 10.1% by weight of $Y_2O_3$, produced by Tosoh Corporation), an AlN powder (Grade AP-10 of a purity of 99.0%, produced by Denki Kagaku Kogyo Kabushiki Kaisha), and a $2CaO \cdot 3B_2O_3$ powder as a binder were mixed in a varying ratio indicated in Table 1 for two hours.

In a graphite die, the resultant mixed powder was hot pressed under the conditions of 2,100° C. and 140 kg/cm², to obtain a sintered article.

The sintered article was fabricated into a sheath. The sheath was tested for chemical composition, density, resistance to thermal shock, resistance to corrosion, and resistance to abrasion.

The results are shown in Table 1.

EXAMPLE 6

Boric acid and melamine were mixed in a weight ratio of 1:1. The resultant mixture was heat-treated in a current of ammonia gas at 1,200° C. for four hours, to obtain a BN powder having a BN purity of 90% and a specific surface area of 50 m²/g.

By the X-ray diffraction analysis, the produced powder was identified to be an amorphous BN powder.

Sheaths were produced by faithfully following the procedure of Example 1, excepting the BN powder just mentioned was used in the place of the hexagonal BN powder used in Example 1. The sheaths were evaluated in the same manner as described above.

The results are shown in Table 1.

EXAMPLE 7

A sheath was produced by following the procedure of Example 1, excepting $9Al_2O_3 \cdot 2B_2O_3$ whiskers (produced by Shikoku Kasei Kogyo K.K. and marketed under trademark designation of "Alborex G") was used in a proportion of 10% by weight in the place of the AlN powder and the proportion of the $ZrO_2$ powder was changed to 20% by weight. The sheath was evaluated in the same manner as in Example 1.

COMPARATIVE EXPERIMENT 4

A sheath was produced by following the procedure of Example 1, excepting 68% by weight of the same BN powder, 5% by weight of the same $ZrO_2$ powder, and 2% by weight of the same $2CaO \cdot 3B_2O_3$ powder as used in Example 1 and 25% by weight of $9Al_2O_3 \cdot 2B_2O_3$ whiskers were combined instead. The resultant sheath was evaluated in the same manner as in Example 1.

The results are shown in Table 1.

TABLE 1

| | Mixing ratio of raw materials (% by weight) | | | | | Composition of sintered article (% by weight) | | | | |
|---|---|---|---|---|---|---|---|---|---|---|
| | BN | $2CaO \cdot 3B_2O_3$ | $ZrO_2$ | AlN | $9Al_2O_3 \cdot 2B_2O_3$ | BN | $2CaO \cdot 3B_2O_3$ | $ZrO_2$ | AlN | $9Al_2O_3 \cdot 2B_2O_3$ |
| Example 1 | 68 | 2 | 10 | 20 | — | 65 | 2 | 10 | 19 | — |
| Example 2 | 68 | 2 | 15 | 15 | — | 66 | 2 | 15 | 14 | — |
| Example 3 | 68 | 2 | 20 | 10 | — | 66 | 2 | 20 | 9 | — |
| Example 4 | 75 | 2 | 14 | 8 | — | 73 | 2 | 14 | 7 | — |
| Example 5 | 80 | 2 | 10 | 8 | — | 78 | 2 | 10 | 7 | — |
| Example 6 | 68 | 2 | 10 | 20 | — | 66 | 2 | 10 | 19 | — |
| Example 7 | 68 | 2 | 20 | — | 10 | 66 | 2 | 20 | — | 9 |
| Comparative Experiment 1 | 50 | 2 | 20 | 28 | — | 48 | 2 | 20 | 26 | — |
| Comparative Experiment 2 | 68 | 2 | 5 | 25 | — | 65 | 2 | 5 | 24 | — |
| Comparative Experiment 3 | 68 | 2 | 26 | 4 | — | 65 | 2 | 26 | 3 | — |

TABLE 1-continued

| | | | | | | | | | |
|---|---|---|---|---|---|---|---|---|---|
| Comparative Experiment 4 | 68 | 2 | 5 | — | 25 | 65 | 2 | 5 | — | 24 |
| Comparative Experiment 5 | 60 | 20 | 10 | 10 | — | 58 | 20 | 10 | 9 | — |

| | Physical properties of sintered article | | | |
|---|---|---|---|---|
| | Density (g/cm³) | Resistance to thermal shock | Resistance to corrosion | Resistance to abrasion |
| Example 1 | 2.14 | ○ | ○ | ○ |
| Example 2 | 2.10 | ○ | ○ | ○ |
| Example 3 | 2.18 | ○ | Δ | ○ |
| Example 4 | 2.20 | ○ | Δ | ○ |
| Example 5 | 2.10 | ○ | Δ | Δ |
| Example 6 | 2.11 | ○ | ○ | Δ |
| Example 7 | 2.12 | ○ | ○ | ○ |
| Comparative Experiment 1 | 2.18 | X | — | — |
| Comparative Experiment 2 | 2.16 | ○ | ○ | X |
| Comparative Experiment 3 | 2.17 | ○ | X | — |
| Comparative Experiment 4 | 2.16 | ○ | ○ | X |
| Comparative Experiment 5 | 2.05 | X | — | — |

This invention is constructed as described above and manifests the following effects.

(1) In accordance with the present invention, the sheath is produced easily and the burden imposed on the apparatus for continuous casting of a thin sheet is alleviated because the sheath excelling in resistance to thermal shock, resistance to corrosion, and resistance to abrasion is produced from one single material.

(2) The continuous casting of a thin sheet is stably attained because the possibility of the sintered article entailing such troubles as fracture is nil and the possibility of the sheath ingate being corroded or abraded and consequently mingling as an extraneous matter into the fused metal and exerting an adverse effect on the cast thin sheet is nil. The sintered article provided by this invention and the sheath using this sintered article, therefore, contribute to improving the quality of the thin sheet to be continuously cast by the apparatus provided on the melt pouring side thereof with cylindrical surfaces such as, for example, a twin roll type, a twin belt type, or a belt drum type apparatus for continuous casting and also to enhancing the productivity of the continuous casting using the apparatus.

What is claimed is:

1. A sintered article for a sheath in an apparatus for continuous casting of a thin sheet, the sintered article consisting essentially of not less than 65% by weight of hexagonal boron nitride, not less than 9% by weight of zirconium oxide, and not less than 5% by weight of aluminum borate.

2. A sintered article according to claim 1, wherein the article comprises not less than 15% by weight zirconium oxide.

3. A sintered article according to claim 1, wherein said zirconium oxide before sintering is stabilized zirconia.

4. A sintered article according to claim 1, wherein the article comprises not less than 10% by weight of aluminum borate.

5. A sintered article according to claim 1, wherein said aluminum borate is at least one member selected from the group consisting of $9Al_2O_3.2B_2O_3$, $2Al_2O_3.B_2O_3$, and $Al_2O_3.B_2O_3$.

6. A sintered article according to claim 1, which further contains not more than 5% by weight of a binder.

* * * * *